(12) United States Patent
Vogler

(10) Patent No.: US 6,945,513 B2
(45) Date of Patent: Sep. 20, 2005

(54) THROTTLE VALVE ARRANGEMENT

(75) Inventor: Hans-Ulrich Vogler, Frankfurt am Main (DE)

(73) Assignee: Siemens Aktiengesellschaft, München (DE)

( * ) Notice: Subject to any disclaimer, the term of this patent is extended or adjusted under 35 U.S.C. 154(b) by 2 days.

(21) Appl. No.: 10/778,022

(22) Filed: Feb. 17, 2004

(65) Prior Publication Data

US 2004/0159818 A1 Aug. 19, 2004

Related U.S. Application Data

(63) Continuation of application No. PCT/DE02/03041, filed on Aug. 19, 2002.

(30) Foreign Application Priority Data

Aug. 23, 2001 (DE) .......................... 101 40 410

(51) Int. Cl.$^7$ ................................. F16K 1/22
(52) U.S. Cl. ................................. 251/308; 137/15.25
(58) Field of Search ................ 251/305, 308; 123/337, 338; 137/15.25, 315.22, 315.24; 29/890.129, 890.131

(56) References Cited

U.S. PATENT DOCUMENTS

| | | | |
|---|---|---|---|
| 3,567,180 A | | 3/1971 | Williams |
| 3,568,975 A | | 3/1971 | Obermaier et al. |
| 3,666,235 A | | 5/1972 | Scott |
| 3,675,681 A | | 7/1972 | Obermaier |
| 4,057,217 A | * | 11/1977 | MacDonald ............... 251/308 |
| 4,325,536 A | | 4/1982 | Garrett |
| 4,335,738 A | * | 6/1982 | Nassir ..................... 251/305 |
| 4,576,360 A | * | 3/1986 | Lew ....................... 251/308 |
| 4,768,750 A | * | 9/1988 | Wilson .................... 251/308 |
| 4,899,775 A | | 2/1990 | Calvin |
| 5,125,624 A | * | 6/1992 | Yohner .................... 251/308 |

FOREIGN PATENT DOCUMENTS

| | | |
|---|---|---|
| DE | 3721624 A1 | 1/1989 |
| DE | 19841181 A1 | 3/2000 |

OTHER PUBLICATIONS

Derwent Abstract DE3721624; Jan. 12, 1989; Verwaltungs Lohse GmbH & Co. KG.
Derwent Abstract DE19841181; Mar. 16, 2000; Robert Bosch GmbH.

* cited by examiner

Primary Examiner—Eric Keasel
(74) Attorney, Agent, or Firm—Jacob Eisenberg; Siemens AG

(57) ABSTRACT

The present invention relates to a throttle valve arrangement for closing a through flow in a throttle valve connection piece, including a pivotably actuated throttle valve shaft which is mounted in the opening in a perpendicular position with respect to the longitudinal extension thereof projecting into the housing of the throttle valve connection piece with the free end thereof. The through flow opening can be closed by a throttle valve which is firmly connected to the throttle valve shaft. The throttle valve comprises a continuous receiving opening extending on the plane thereof in a perpendicular position with respect to the opening and through which the throttle valve shaft is guided. Additionally, a recess is formed in the throttle valve, extending form the through opening to the receiving opening in the area where the throttle valve is connected to the throttle valve shaft by means of a welded connection.

14 Claims, 1 Drawing Sheet

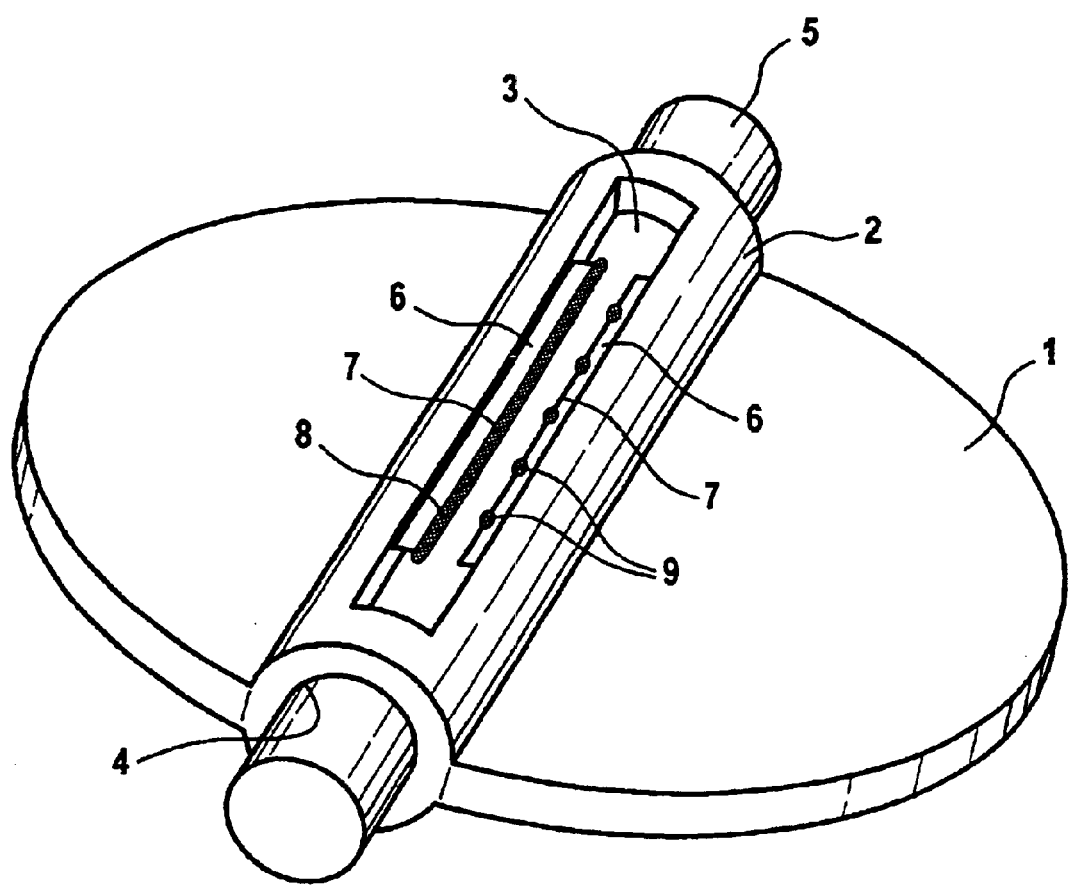

THROTTLE VALVE ARRANGEMENT

CROSS REFERENCE TO RELATED APPLICATIONS

The present application is a continuation of international application PCT/DE02/03041, filed 19 Aug. 2002 and further claims priority to German patent application DE10140410.7, filed 23 Aug., 2001, the both of which are herein incorporated by reference.

BACKGROUND OF THE INVENTION

The invention relates to a throttle valve arrangement for closing a through flow opening in a throttle valve connection piece, in particular for an internal combustion engine, having a pivotally actuated throttle valve shaft which the through flow opening is mounted transversely with respect to its longitudinal extent, projecting with its free ends into the housing of the throttle valve connection piece, and having a throttle valve which is firmly connected to the throttle valve shaft and by means of which the through flow opening can be closed.

In such throttle valve arrangements, it is known to introduce the throttle valve into an axial slot in the throttle valve shaft. Drilled holes and threaded drilled holes are formed in the throttle valve shaft, transversely to the plane of the throttle valve, and as a result recesses, into which screws for attaching the throttle valve to the throttle valve shaft are screwed, are formed flush in the throttle valve shaft.

In order to secure the screws against unintentional loosening, the screws also have screw protections. This design is complex and costly in terms of mounting. Furthermore, the additive manufacture tolerances of the throttle valve, throttle valve shaft, axial slot and the threaded drilled holes and recesses give rise to a relatively large degree of play of the throttle valve in the through flow opening of the throttle valve connection piece and thus to a relatively high leakage rate when the throttle valve is closed.

SUMMARY OF THE INVENTION

An object of the invention is therefore to provide a throttle valve arrangement of the type specified at the beginning which is composed of a small number of simple components, is easy to mount, and has only a small leakage rate when the throttle valve is closed.

This object is achieved according to the invention in that the throttle valve has a receiving opening which extends continuously in its plane, transversely with respect to the through flow opening, through which receiving opening the throttle valve shaft is guided and having one or more recesses, continuing from the through flow opening to the receiving opening, in the throttle valve, in the region which of which recesses the throttle valve is connected to the throttle valve shaft by means of a welded connection. This embodiment requires only a small number of simple components.

For the purpose of mounting, the throttle valve shaft is guided, by means of the mounts in the throttle valve connection piece and by means of the receiving opening, in the throttle valve which is inserted into the through flow opening, and is not firmly connected by means of the welded connection to the throttle valve shaft until after the throttle valve has been positioned to an optimized degree in the through flow opening. Before assembly, separately manufactured threaded drilled holes and recesses are not present on the throttle valve shaft and therefore do not need to be taken into account in the tolerances, with the result that the throttle valve can be inserted with only a low degree of play, and nevertheless in a freely moving fashion, in the through flow opening, before it is fastened after it has been positioned to an optimized degree. The device for manufacturing the welded connection is guided here from the outside with respect to the welding location by means of the through flow opening. The connection using a material between the two components to be connected gives rise to a very high degree of securement against unintentional loosening without special securing elements being required for this purpose. This is a particular advantage in the case of throttle valve arrangements with small throttle valves which, according to the conventional technology, can only be fastened to the throttle valve shaft using a single screw, for reasons of space, and thus constitute a particularly high risk with respect to the unintentional loosening of the throttle valve.

Such throttle valve arrangements can preferably be applied in what are referred to as E-gas systems for internal combustion engines in motor vehicles. However, other applications such as, for example, in exhaust gas recirculation systems, are equally possible.

In order to be able to form the receiving opening for the throttle valve shaft in a throttle valve of low thickness, the throttle valve can be formed in the manner of a hub in the region of the receiving opening.

In order to be able to manufacture a connection between the throttle valve and throttle valve shaft even if these two components are composed of different materials which cannot be welded to one another, the throttle valve can have a connecting element which is firmly connected to it and which projects into the recess in the throttle valve, is composed of a material which can be welded to the throttle valve shaft and is welded, at its region projecting into the recess, to the throttle valve shaft.

The connecting element preferably projects tangentially with respect to the throttle valve shaft into the opening.

If two connecting elements are arranged firmly connected to the throttle valve and project in opposite directions to one another and tangentially with respect to the throttle valve shaft into the recesses, on the one hand the securement against unintentional loosening is thus particularly high, and on the other hand the type of torque loading is always the same, irrespective of the direction of rotation.

If, in this context, the ends of the connecting elements which face one another are at least approximately in contact, both connecting elements can be connected simultaneously to the throttle valve shaft using a single welding process. A largely uniform transmission of torque over the width of the throttle valve is carried out in that the connecting element or the connecting elements extend at least largely over the entire width of the recess in the direction of extent of the throttle valve shaft.

If a plurality of connecting elements are arranged one next to the other in the direction of extent of the throttle valve shaft, the reliability in terms of the optimum abutment of the connecting elements against the throttle valve shaft is very high, irrespective of the tolerances of its fastening to the throttle valve.

If the throttle valve is manufactured by means of an injection molding method and the connecting element is firmly connected to the throttle valve as an insertion part by encapsulation by injection molding using the material of the throttle valve during its manufacture, no separate mounting operations and no particular fastening elements are necessary to connect the connecting elements to the throttle valve. In this context, the connecting element may be an insertion plate which comes into abutment in a sprung fashion with its free end against the throttle valve shaft and thus provides a high degree of securement when the connecting element and throttle valve shaft are welded.

Manufacture is made particularly easy if the throttle valve is a component which is manufactured from a lightweight metal or from a plastic using an injection molding method.

The throttle valve shaft may be composed here of steel and as a result provide a high degree of resistance against wear in the bearings of the housing of the throttle valve connection piece.

The connection between the connecting element and throttle valve shaft is made particularly secure if the connecting element is in abutment with its free end against the throttle valve shaft with prestress.

If the welded connection is a fused welded connection generated by resistance welding or laser welding, the components which are to be connected to one another are heated only in the actual welding region. Heat stresses, which could lead to distortion or damage to the components, do not occur. Furthermore, the devices for resistance welding or laser welding can also easily be inserted as far as the welding location through the through flow opening of the throttle valve connection piece.

The welded connection can either be made by means of a welding seam or by means of one or more welding points.

BRIEF DESCRIPTION OF THE SEVERAL VIEWS OF THE DRAWINGS

An exemplary embodiment of the invention is illustrated in the drawing and will be described in more detail below. The single FIGURE of the drawing shows a perspective view of a throttle valve arrangement.

DETAILED DESCRIPTION OF THE INVENTION

The illustrated throttle valve arrangement has a throttle valve 1 which is manufactured from plastic using an injection molding method and has a hub 2 which extends centrally over the width of the throttle valve and is formed in one piece with the throttle valve 1.

Formed at a right angle to the plane of the throttle valve 1, a slit-like recess 3, which is continuous and opens into a receiving opening 4, formed by the hub drilled hole, for a throttle valve shaft 5 and into which the throttle valve shaft 5 is inserted is formed extending largely over the length of said throttle valve 1.

Connecting elements 6 which are included in the injection molding process are arranged on the opposite longitudinal sides of the recess 3, with their one ends as insertion plates in the hub 2 during the manufacture of the throttle valve 1, said connecting elements 6 projecting, in opposite directions to one another and tangentially with respect to the throttle valve shaft 5, into the recesses 3 and bearing with their free ends 7 with prestress of a throttle valve shaft 5.

Both the connecting element 6 and the throttle valve shaft 5 are composed of steel. Along the longitudinal edge—bearing against the throttle valve shaft 5—of the free end 7 of the left hand connecting element 6, said connecting element 6 is firmly connected to the throttle valve shaft 5 by means of a continuous welding seam 8.

The right-hand connecting element 6 is firmly connected to the throttle valve shaft 5 by means of welding points 9, also along the longitudinal edge—bearing against the throttle valve shaft 5—of the free end 7 of the right hand connecting element 6, said welding points 9 being formed distributed at a distance from one another over the entire length of the longitudinal edge of the free end 7 of the connecting element 6.

Both the welding seam 8 and the welding points 9 are generated by laser welding.

The illustrated welding seam 8 and the illustrated welding points 9 are two alternative possible ways (illustrated on a throttle valve 1) of forming the welded connection. It goes without saying that it is also possible to provide only welding seams 8 or only welding points as a welded connection on a throttle valve.

I claim:

1. An arrangement for closing a through flow opening in a throttle valve connection piece of an internal combustion engine, comprising:

a throttle valve shaft positioned over and transverse to said through flow opening, said shaft pivotably mounted to said throttle valve connection piece; and a throttle valve comprising a receiving opening and one or more recesses, said receiving opening running a length of and planar to said valve and comprising an interior opening wherein said shaft is mounted such that said valve selectively closes said flow opening, and said one or more recesses extend into said interior opening exposing said shaft wherein said valve is connected to said shaft by at least one welding and wherein said throttle valve comprises a connecting element welded to said throttle valve and projecting into said one or more recesses, said connecting element comprising a material weldable to said throttle valve shaft.

2. The arrangement according to claim 1, wherein said valve comprises walls forming a hub, said hub comprising said receiving opening.

3. The arrangement according to claim 1, wherein said connecting element is welded to said throttle valve shaft at its projection within said one or more recesses.

4. The arrangement according to claim 3, wherein said connecting element projects tangentially with respect to the throttle valve shaft into said one or more recesses.

5. The arrangement according to claim 1, wherein said connecting element comprises two connecting elements arranged connected to said throttle valve and projecting, in opposite directions to one another, tangential to said throttle valve shaft, and into each of said one or more recesses.

6. The arrangement according to claim 5, wherein said shaft further comprises opposing ends projecting into a housing of said throttle valve connection piece.

7. The arrangement according to claim 1, wherein said connecting element extends, along said valve shaft, and a substantial length of said one or more recesses.

8. The arrangement according to claim 7, wherein said throttle valve comprises a lightweight metal.

9. The arrangement according to claim 7, wherein said throttle valve comprises a plastic used in injection molding.

10. The arrangement according to claim 1, further comprising a plurality of connecting elements adjacently arranged within each of said one or more recesses and along said throttle valve shaft.

11. The arrangement according to claim 1, wherein:
said valve comprises an injection molded material, and
said connecting element is firmly connected to said throttle valve as an insertion part by injection molding using the material of the throttle valve during its manufacture.

12. The arrangement according to claim 11, wherein said connecting element is an insertion plate.

13. The arrangement according to claim 1, wherein said throttle valve shaft comprises steel.

14. The arrangement according to claim 1, wherein an end of said connecting element abuts said throttle valve shaft with prestress.

* * * * *